US009749942B2

(12) United States Patent
Katar et al.

(10) Patent No.: US 9,749,942 B2
(45) Date of Patent: Aug. 29, 2017

(54) WI-FI POWER SAVING BASED ON COARSE MOTION CLASSIFICATION INFORMATION

(71) Applicant: QUALCOMM Incorporated, San Diego, CA (US)

(72) Inventors: Srinivas Katar, Fremont, CA (US); Xiaolong Huang, San Jose, CA (US); Hoon Ki Lee, San Jose, CA (US); Farrukh Usmani, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/065,037

(22) Filed: Mar. 9, 2016

(65) Prior Publication Data

US 2017/0019837 A1 Jan. 19, 2017

Related U.S. Application Data

(60) Provisional application No. 62/192,671, filed on Jul. 15, 2015.

(51) Int. Cl.

| | |
|---|---|
| ***H04W 4/00*** | (2009.01) |
| ***H04W 48/16*** | (2009.01) |
| ***H04B 17/318*** | (2015.01) |
| ***H04W 8/22*** | (2009.01) |
| ***H04W 36/00*** | (2009.01) |
| *H04W 64/00* | (2009.01) |
| *H04W 84/12* | (2009.01) |

(52) U.S. Cl.

CPC .......... *H04W 48/16* (2013.01); *H04B 17/318* (2015.01); *H04W 8/22* (2013.01); *H04W 36/0094* (2013.01); *H04W 64/006* (2013.01); *H04W 84/12* (2013.01); *Y02B 60/50* (2013.01)

(58) Field of Classification Search

CPC .................................................... H04W 48/16

See application file for complete search history.

(56) References Cited

U.S. PATENT DOCUMENTS

| | | | | |
|---|---|---|---|---|
| 9,084,181 | B2 | 7/2015 | Brisebois | |
| 2008/0112346 | A1* | 5/2008 | Tolpin ............... | H04W 52/0254 370/311 |
| 2013/0150012 | A1* | 6/2013 | Chhabra ............... | H04W 48/16 455/418 |
| 2013/0176869 | A1 | 7/2013 | Finlow-Bates et al. | |
| 2013/0308512 | A1 | 11/2013 | Jeong | |
| 2014/0079014 | A1 | 3/2014 | Lee | |
| 2014/0269363 | A1 | 9/2014 | Lee et al. | |

(Continued)

OTHER PUBLICATIONS

International Search Report and Written Opinion—PCT/US2016/041946—ISA/EPO—dated Oct. 27, 2016.

*Primary Examiner* — Justin Lee
(74) *Attorney, Agent, or Firm* — Paradice and Li LLP

(57) ABSTRACT

Systems and methods are disclosed that may adjust the likelihood and/or frequency with which a wireless device performs scanning operations to reduce power consumption without degrading the ability of the wireless device to identify the best available access point with which to associate. In some aspects, the wireless device may adjust the likelihood and/or frequency of performing scanning operations based on a motion state of the wireless device, a change in the motion state of the wireless device, a signal strength of an associated access point, and/or the connection status of the wireless device.

26 Claims, 10 Drawing Sheets

700A determine that the wireless device is in a stationary motion state. (701)

determine that the wireless device is connected to an access point. (702)

703 Stationary and connected?

no yes decrease a likelihood of performing scanning operations if the wireless device is in the stationary motion state and if the wireless device is connected to the access point. (704)

trigger at least one of the scanning operations based on the decreased likelihood. (705)

(56) References Cited

U.S. PATENT DOCUMENTS

2014/0274041 A1 9/2014 Lee et al.
2014/0274044 A1 9/2014 Lee et al.
2015/0045020 A1* 2/2015 Wang ................ H04W 36/0088 455/434
2015/0045021 A1 2/2015 Schlatter et al.
2015/0245280 A1 8/2015 Zhou et al.

* cited by examiner

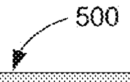

| Motion State | Wi-Fi State | MAWC Used? | Use Case Description |
|---|---|---|---|
| Stationary | Connected | Yes | Use motion state information to suppress roaming scans based on RSSI fluctuations because new APs may be unlikely to appear. |
| | Disconnected | Yes | Use motion state information to reduce PNO scanning frequency because new APs may be unlikely to appear when STA is stationary. |
| Walking | Connected | No | Scanning engine performs roaming scans where there are significant and persistent changes in RSSI values. |
| | Disconnected | No | Do not use motion state information to influence PNO scans because new APs are likely to appear when STA is in motion. |
| Running | Connected | No | Scanning engine performs roaming scans where there are significant and persistent changes in RSSI values. |
| | Disconnected | No | Do not use motion state information to influence PNO scans because new APs are likely to appear when STA is in motion. |
| Vehicle | Connected | No | When traveling in a car or bus, the connected AP's RSSI is likely to be strong, and thus it is may be beneficial to suppress roaming scans.<br><br>When traveling in a train, ship, or plane, it may be more likely that there are several APs present for roaming. Suppressing roaming scans may not be beneficial.<br><br>Because the scanning engine may perform roaming scans whenever there are persistent and significant RSSI changes, motion state information is not used to suppress roaming scans. |
| | Disconnected | Yes | When traveling in a car or bus, it is unlikely to find new APs that provide persistent connectivity. Motion state information may be used to reduce PNO scanning frequency.<br><br>When traveling in a train, ship, or plane, it may be unlikely to connect to an AP, and thus motion state information may be used to reduce PNO scanning frequency. |
| Moving to stationary | Connected | Yes | When a user in motion comes to a stop, the user may remain stationary for a time period. Thus, motion state information may be used to additional roaming scans. |

FIG. 5

WI-FI POWER SAVING BASED ON COARSE MOTION CLASSIFICATION INFORMATION

CROSS-REFERENCE TO RELATED APPLICATION

This application claims priority to U.S. Provisional Patent Application No. 62/192,671 entitled "WI-FI POWER SAVING BASED ON COARSE MOTION CLASSIFICATION INFORMATION" filed Jul. 15, 2015, the entirety of which is incorporated by reference herein.

TECHNICAL FIELD

The example embodiments relate generally to wireless networks, and specifically to reducing power consumption associated with scanning for nearby wireless networks.

BACKGROUND OF RELATED ART

A wireless local area network (WLAN) may be formed by one or more access points (APs) that provide a shared wireless communication medium for use by a number of client devices or stations (STAs). Each AP, which may correspond to a Basic Service Set (BSS), periodically broadcasts beacon frames to enable any STAs within wireless range of the AP to establish and/or maintain a communication link with the WLAN. In a typical WLAN, only one STA may use the wireless medium at any given time, and each STA may be associated with only one AP at a time. Due to the increasing ubiquity of wireless networks, when a STA seeks to join a wireless network, the STA may have a choice between multiple wireless networks and/or between multiple APs (e.g., that form an extended BSS). Thus, the STA may periodically scan its surroundings to find and/or determine the best available AP with which to associate. Because scanning operations may consume a significant amount of power, it is desirable to reduce power consumption associated with scanning operations.

SUMMARY

This Summary is provided to introduce in a simplified form a selection of concepts that are further described below in the Detailed Description. This Summary is not intended to identify key features of essential features of the claimed subject matter, nor is it intended to limit the scope of the claimed subject matter.

Apparatus and methods are disclosed that may reduce power consumption associated with Wi-Fi scanning operations. In one example, a method of initiating scanning operations for local wireless networks is disclosed. The method may include: determining if the wireless device is in a stationary motion state; determining if the wireless device is connected to an access point; if the wireless device is in the stationary motion state and if the wireless device is connected to the access point, decreasing a likelihood of performing the scanning operations; and triggering at least one of the scanning operations based on the decreased likelihood.

In another example, a wireless device is disclosed. The wireless device may include one or more processors and a memory storing programs comprising instructions. Execution of the instructions by the one or more processors may cause the wireless device to: determine if the wireless device is in a stationary motion state; determine if the wireless device is connected to an access point; decrease a likelihood of performing the scanning operations if the wireless device is in the stationary motion state and if the wireless device is connected to the access point; and trigger at least one of the scanning operations based on the decreased likelihood.

In another example, a non-transitory computer-readable storage medium is disclosed. The non-transitory computer-readable storage medium may store one or more programs containing instructions that, when executed by one or more processors of a wireless device, cause the wireless device to perform operations. The operations may include: determining if the wireless device is in a stationary motion state; determining if the wireless device is connected to an access point; decreasing a likelihood of performing the scanning operations if the wireless device is in the stationary motion state and if the wireless device is connected to the access point; and triggering at least one of the scanning operations based on the decreased likelihood.

In another example, a wireless device configured to initiate scanning operations for local wireless is disclosed. The wireless device may include: means for determining if the wireless device is in a stationary motion state; means for determining if the wireless device is connected to an access point; means for decreasing a likelihood of performing the scanning operations if the wireless device is in the stationary motion state and if the wireless device is connected to the access point; and means for triggering at least one of the scanning operations based on the decreased likelihood.

BRIEF DESCRIPTION OF THE DRAWINGS

The example embodiments are illustrated by way of example and are not intended to be limited by the figures of the accompanying drawings. Like numbers reference like elements throughout the drawings and specification.

FIG. 5 shows a table of example use cases for a motion-aided Wi-Fi connectivity subsystem in accordance with example embodiments.

DETAILED DESCRIPTION

Figure 1:
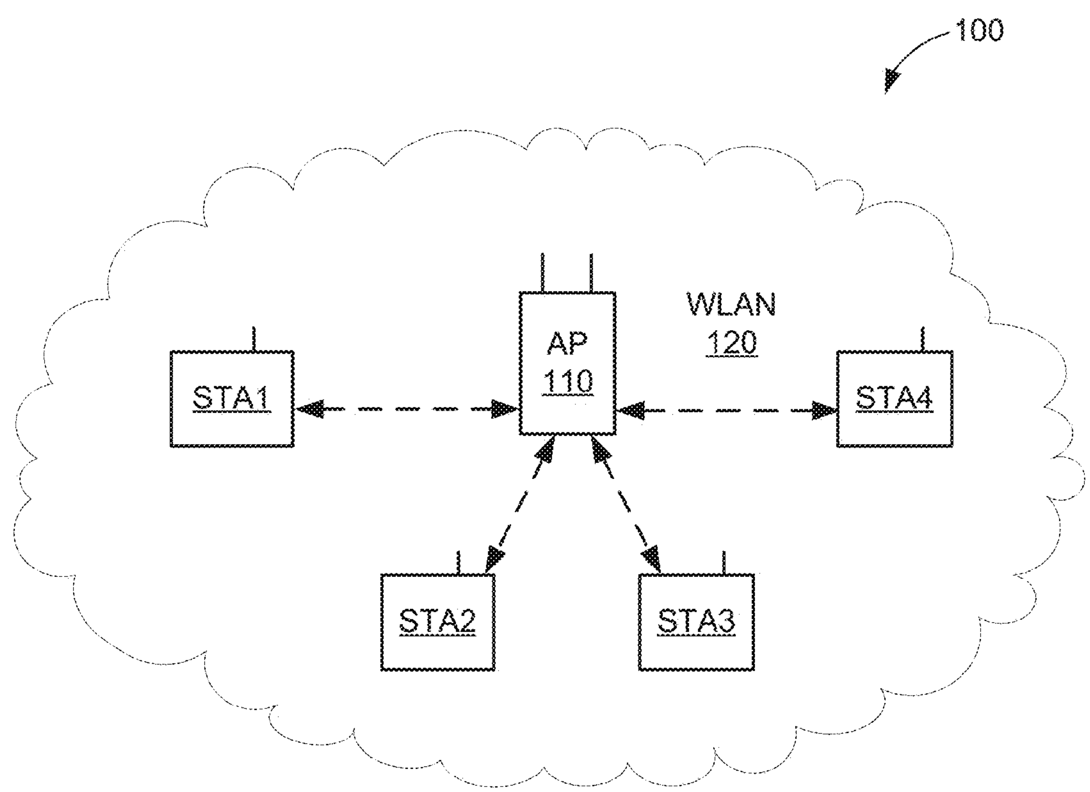
FIG. 1 shows a block diagram of an example wireless system within which the example embodiments may be implemented.

The example embodiments are described below in the context of WLAN systems for simplicity only. It is to be understood that the example embodiments are equally applicable to other wireless networks (e.g., cellular networks, pico networks, femto networks, satellite networks), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, BLUETOOTH® (Bluetooth or BT), HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including an AP and a plurality of STAs, the example embodiments are equally applicable to other WLAN systems including, for example, WLANs including a plurality of APs, peer-to-peer (or Independent Basic Service Set) systems, Wi-Fi Direct systems, and/or Hotspots. In addition, although described herein in terms of exchanging data packets between wireless devices, the example embodiments may be applied to the exchange of any data unit, packet, and/or frame between wireless devices. Thus, the term "data packet" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

As used herein, the terms "scanning" and "scan operation" may refer to a process by which a wireless device searches for an access point (AP) with which to associate (e.g., by broadcasting probe requests), and the term "dwell time" may refer to a time period during which the wireless device remains on a particular channel (e.g., to listen for a probe response from the AP) before moving on to the next channel in the scan operation. Further, as used herein, the term "saved-profile AP" may refer to any AP with which a wireless device had prior communications, and the term "saved channel" may refer to a wireless channel on which the prior communications took place.

The term "associated AP" refers to an AP with which a given STA is associated (e.g., there is an established communication channel or connection between the AP and the given STA). The term "non-associated AP" refers to an AP with which a given STA is not associated (e.g., there is not an established communication channel or connection between the AP and the given STA, and thus the AP and the given STA may not yet exchange data frames). The term "associated STA" refers to a STA that is associated with (e.g., connected to) a given AP, and the term "non-associated STA" refers to a STA that is not associated with (e.g., not connected to) the given AP.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The example embodiments are not to be construed as limited to specific examples described herein but rather to include within their scope all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that may be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other suitable configuration.

As mentioned above, a wireless device such as a STA may periodically scan its surroundings to find and/or determine the most suitable AP with which to associate. Connected scans (also known as "roaming" scans) may refer to scanning operations performed by a STA that is connected to an AP, and are typically performed to determine whether there are any nearby candidate APs that may offer a better connection or better service that the AP with which the STA is currently associated. Although many STAs suppress connected scans to reduce power consumption, suppressing connected scans may prevent the STA from roaming to a "better" AP. Disconnected scans (also known as preferred network offload (PNO) scans) may refer to scanning operations performed by a STA that is not connected to any AP. Disconnected scans may involve a trade-off between reducing power consumption and the speed with which the STA may identify and associated with a nearby AP. For example, increasing the frequency of disconnected scans may result in faster connections to an AP but may also increase power consumption. Because scanning operations may consume a significant amount of power, it is desirable to reduce power consumption associated with scanning operations without degrading the ability of a wireless device to find the best available AP with which to associate.

In accordance with the example embodiments, apparatuses and methods are disclosed that may allow a wireless device to reduce the frequency of scanning operations to reduce power consumption without degrading the ability of the wireless device to find the best available AP with which to associate. More specifically, for at least some implementations, the wireless device's scanning operations may be selectively triggered based on a number of factors that may include, for example, a motion state of the wireless device, a change in the motion state of the wireless device, a length of time that the wireless device has been in its current motion state, a length of time since the last change in motion state of the wireless device, received signal strength indicator (RSSI) values of nearby APs, and/or a connected state of the wireless device. In some aspects, the wireless device's motion state may include course motion states of "stationary," "moving," and/or "fiddle." The "stationary" motion state may indicate that the wireless device is not in motion. The "moving" motion state may indicate that the wireless device is in motion, and may further include a pedestrian motion state and a vehicle motion state. The pedestrian motion state may further include a walking motion state and a running motion state. The "fiddle" motion state may indicate that a user is holding the wireless device in such a manner that the wireless device may be in motion relative to a stationary user (e.g., the user may be waving or rotating the wireless device). As described in more detail below, the example embodiments may use one or more of the above-mentioned factors to reduce the frequency of scanning operations and/or to facilitate additional scanning operations when likely to result in better connectivity for the wireless device.

FIG. 1 is a block diagram of a wireless system 100 within which the example embodiments may be implemented. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 may be assigned a unique media access control (MAC) address that is programmed therein by, for example, the manufacturer of the access point. Similarly, each of STA1-STA4 may be also assigned a unique MAC address. For example embodiments, the wireless system 100 may correspond to a multiple-input multiple-output (MIMO) wireless network. Further, although the WLAN 120 is depicted in FIG. 1 as a BSS, for other example embodiments, WLAN 120 may be an infrastructure BSS (IBSS), an ad-hoc network, or a peer-to-peer (P2P) network (e.g., operating according to the Wi-Fi Direct protocols).

Each of stations STA1-STA4 may be any suitable Wi-Fi enabled wireless device including, for example, a cell phone, personal digital assistant (PDA), tablet device, laptop computer, or the like. Each station STA may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, each station STA may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 6, 7A-7B, 8, and 9.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include one or more transceivers, one or more processing resources (e.g., processors and/or ASICs), one or more memory resources, and a power source. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 6, 7A-7B, 8, and 9.

For the stations STA1-STA4 and/or AP 110, the one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 900 MHz frequency band, a 2.4 GHz frequency band, a 5 GHz frequency band, and/or within a 60 GHz frequency band in accordance with the IEEE 802.11 family of standards. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within the stations STA1-STA4 and/or AP 110 may be any technically feasible transceiver such as a ZigBee transceiver described by a specification from the ZigBee specification, a WiGig transceiver, and/or a HomePlug transceiver described a specification from the HomePlug Alliance.

Figure 2:
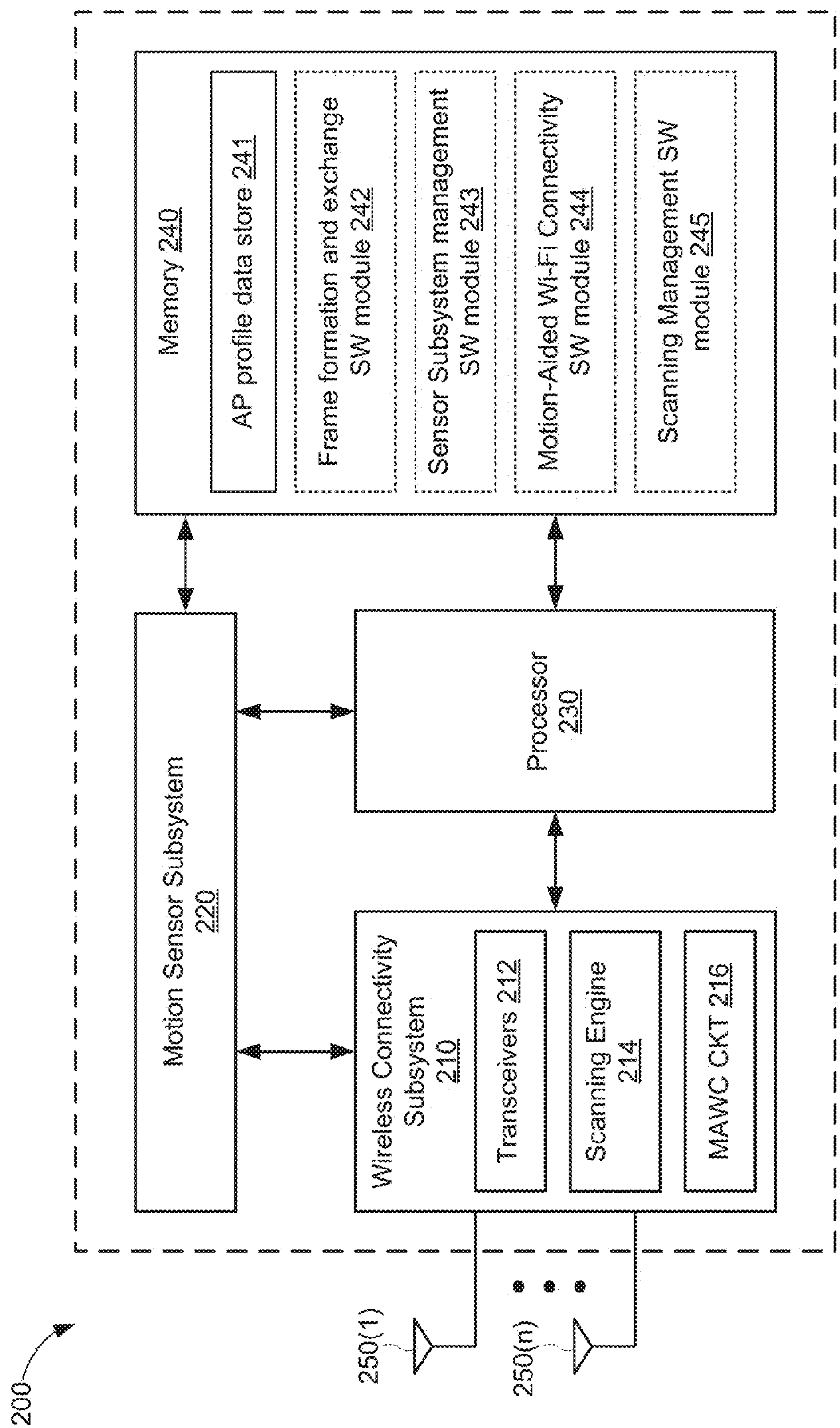
FIG. 2 shows a block diagram of a wireless station (STA) in accordance with example embodiments.

FIG. 2 shows an example STA 200 that may be one embodiment of one or more of the stations STA1-STA4 of FIG. 1. The STA 200 may include a wireless connectivity subsystem 210, a motion sensor subsystem 220, a processor 230, a memory 240, and a number of antennas 250(1)-250 (*n*). The wireless connectivity subsystem (WCNSS) 210 may include at least a number of transceivers 212, a scanning engine 214, and a motion-aided Wi-Fi connectivity (MAWC) circuit 216. The transceivers 212 may be coupled to antennas 250(1)-250(*n*), either directly or through an antenna selection circuit (not shown for simplicity). The transceivers 212 may be used to transmit signals to and receive signals from AP 110 and/or other STAs (see also FIG. 1), and may be used to scan the surrounding environment to detect and identify nearby access points and/or other STAs (e.g., within wireless range of STA 200). Although not shown in FIG. 2 for simplicity, the transceivers 212 may include any number of transmit chains to process and transmit signals to other wireless devices via antennas 250(1)-250(*n*), and may include any number of receive chains to process signals received from antennas 250(1)-250(*n*). Thus, for example embodiments, the STA 200 may be configured for MIMO. The MIMO operations may include single-user MIMO (SU-MIMO) operations and multi-user MIMO (MU-MIMO) operations.

The scanning engine 214, which may be coupled to transceivers 212 and to MAWC circuit 216, may perform scanning operations for STA 200. The scanning operations may be used to locate and identify nearby APs (or other suitable wireless devices) with which STA 200 may establish a connection. The scanning engine 214 may perform connected scans (e.g., roaming scans) and disconnected scans (e.g., PNO scans) to ensure that the STA 200 is associated with the best available AP. As used herein, the best available AP may refer to the AP having the highest RSSI values, the highest goodput values, and/or the best overall service available to the STA 200. The scanning engine 214 may initiate scanning operations based, at least in part, on a trigger signal (or trigger signals) and/or threshold values provided by the MAWC circuit 216.

The MAWC circuit 216 may generate trigger signals that, when asserted, cause the scanning engine 214 to initiate and/or perform scanning operations. For at least some implementations, the MAWC circuit 216 may assert (e.g., to logic high) the trigger signals based on motion state information of the STA 200, connection status indicators of the STA 200, and/or RSSI values of nearby APs. The motion state information, which may be received from the motion sensor subsystem 220, may include a current motion state of STA 200, a change in the motion state of STA 200, a length of time that the STA 200 has been in the current motion state, and/or a length of time since the last change in the motion state of the STA 200. The connection status indicators, which may be provided by the transceivers 212 (or other components associated with a Wi-Fi controller, not shown in FIG. 2 for simplicity) may indicate whether the STA 200 is currently connected to (e.g., associated with) a particular AP or whether the STA 200 is currently not connected to any AP. The RSSI values may indicate signal strengths of nearby APs.

Although not shown in FIG. 2 for simplicity, the WCNSS 210 may include a baseband processor to process signals received from processor 230 and/or memory 240 and to forward the processed signals to transceivers 212 for transmission via one or more of antennas 250(1)-250(*n*), and may be used to process signals received from one or more of antennas 250(1)-250(*n*) via transceivers 212 and to forward the processed signals to processor 230 and/or memory 240.

Further, although not shown in FIG. 2 for simplicity, the WCNSS 210 may include a number of contention engines to contend for access to one more shared wireless mediums and/or to store packets for transmission over the one or more shared wireless mediums. In some aspects, the STA 200 may include one or more contention engines for each of a plurality of different access categories.

The motion sensor subsystem 220 may include one or more sensors (not shown in FIG. 2 for simplicity) to detect motion (or lack of motion) of the STA 200. In some aspects, the one or more sensors may be inertia sensors and/or accelerometers. In other aspects, the one or more sensors may be any suitable sensor or circuit that is capable of determining whether STA 200 is in motion or is stationary. In some aspects, the motion sensor subsystem 220 may be an advanced digital signal processor (ADSP). The motion sensor subsystem 220 may include a motion classifier (not shown in FIG. 2 for simplicity) to classify the motion state of the STA 200 (e.g., stationary, moving, and fiddle) and/or to detect a change in the motion state of the STA 200 based on motion data provided by the one or more sensors, for example, as described in more detail below with respect to FIGS. 3-4.

Processor 230 may be any suitable one or more processors capable of executing scripts or instructions of one or more software programs stored in STA 200 (e.g., within memory 240). Although processor 230 is depicted in the example of FIG. 2 as coupled to WCNSS 210, motion sensor subsystem 220, and memory 240, for other implementations, WCNSS 210, motion sensor subsystem 220, processor 230, and memory 240 may be connected together using one or more suitable buses (not shown for simplicity).

Memory 240 may include an AP profile data store 241 that stores profile information for a plurality of APs. The profile information for a particular AP may include information including, for example, the AP's service set identification (SSID), MAC address, channel information, received signal strength indicator (RSSI) values, goodput values, channel state information (CSI), supported data rates, supported channel access protocols, connection history with STA 200, a trustworthiness value of the AP (e.g., indicating a level of confidence about the AP's location, etc.), and any other suitable information pertaining to or describing the operation of the AP.

Memory 240 may also include a non-transitory computer-readable medium (e.g., one or more nonvolatile memory elements, such as EPROM, EEPROM, Flash memory, a hard drive, and so on) that may store at least the following software (SW) modules:

- a frame formatting and exchange software module 242 to facilitate the creation and exchange of any suitable frames (e.g., data frames, action frames, control frames, and management frames) between STA 200 and other wireless devices (e.g., as described below for one or more operations of FIGS. 6, 7A-7B, 8, and 9);
- a sensor subsystem management software module 243 to configure motion sensor subsystem 220 and/or to receive motion state information from motion sensor subsystem 220 (e.g., as described below for one or more operations of FIGS. 6, 7A-7B, 8, and 9);
- a motion-aided Wi-Fi connectivity (MAWC) software module 244 to generate a trigger signal to initiate scanning operations based on the motion state information, connection status indicators, and/or RSSI values and to selectively adjust one or more threshold values associated with initiating scanning operations (e.g., as described below for one or more operations of FIGS. 6, 7A-7B, 8, and 9); and a scanning management software module 245 to initiate and/or suppress scanning operations based on the trigger signal, the one or more threshold values, and/or results from previous scanning operations (e.g., as described below for one or more operations of FIGS. 6, 7A-7B, 8, and 9).

Each software module includes instructions that, when executed by processor 230, cause STA 200 to perform the corresponding functions. The non-transitory computer-readable medium of memory 240 thus includes instructions for performing all or a portion of the STA-side operations depicted in FIGS. 6, 7A-7B, 8, and 9.

For example, processor 230 may execute the frame formatting and exchange software module 242 to facilitate the creation and exchange of any suitable frames (e.g., data frames, action frames, control frames, and management frames) between STA 200 and other wireless devices. Processor 230 may execute the sensor subsystem management software module 243 to configure motion sensor subsystem 220 and/or to receive motion state information from motion sensor subsystem 220. Processor 230 may execute the MAWC software module 244 to generate a trigger signal to initiate scanning operations based on the motion information, connection status indicators, and/or RSSI values and to selectively adjust one or more threshold values associated with initiating scanning operations. Processor 230 may execute the scanning management software module 245 to initiate and/or prevent scanning operations based on the trigger signal, the one or more threshold values, and/or results from previous scanning operations.

Figure 3:
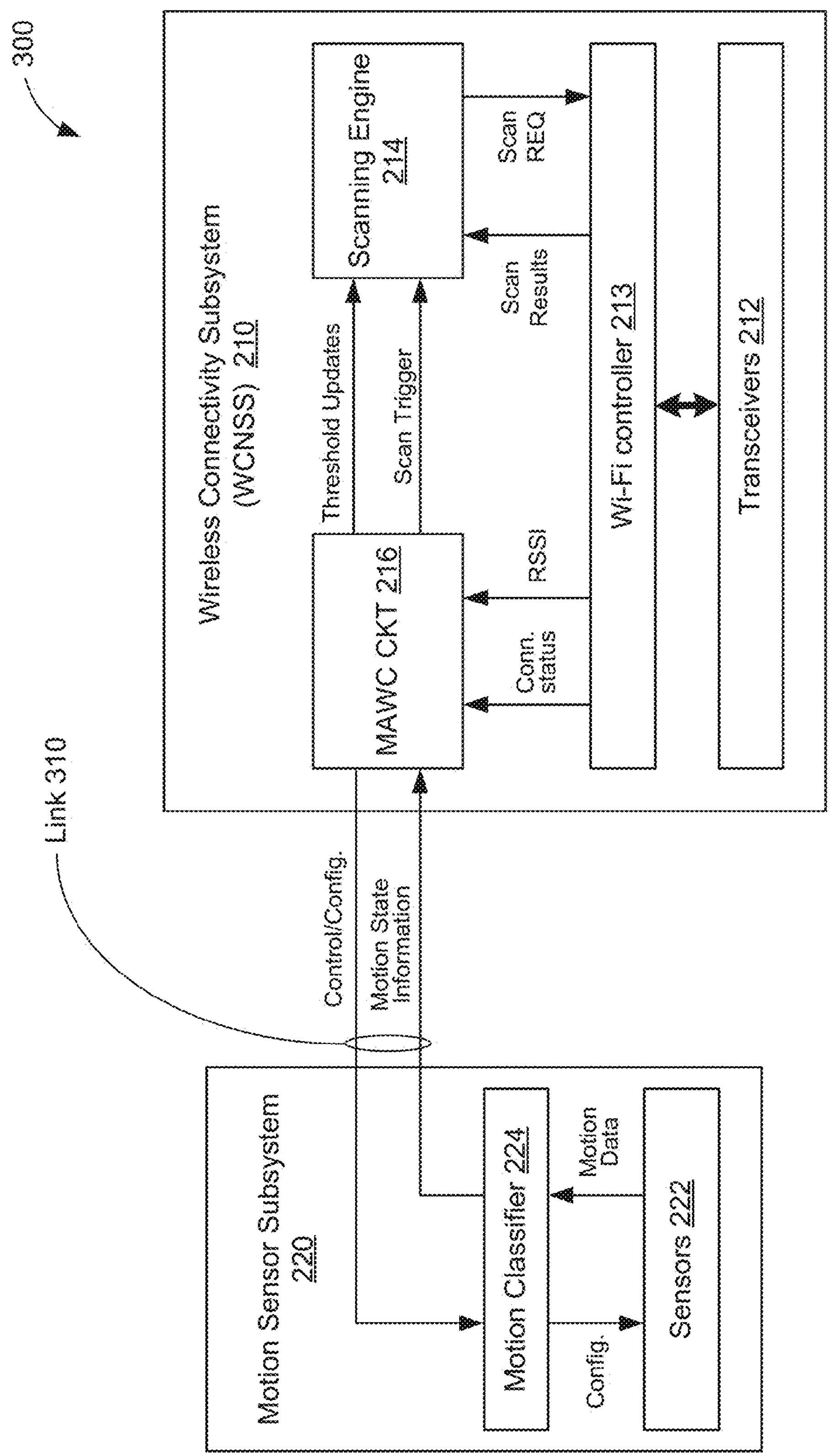
FIG. 3 shows a block diagram of an example architecture in accordance with some aspects of the example embodiments.

FIG. 3 is a block diagram of an example architecture 300 that may be implemented within STA 200 of FIG. 2. The architecture 300 is shown to include the WCNSS 210 and the motion sensor subsystem 220 of FIG. 2 coupled together by a link 310. For the example of FIG. 3, the motion sensor subsystem 220 is shown to include sensors 222 and a motion classifier 224. As described above, the sensors 222 may be any suitable sensors capable of detecting motion (or lack of motion) of STA 200. More specifically, the sensors 222 may generate the motion data based on one or more sensing operations, or may receive the motion data (e.g., from another suitable source or device). The sensors 222 may send the motion data to the motion classifier 224. In some aspects, sensors 222 may continuously provide the motion data to motion classifier 224. In other aspects, sensors 222 may periodically (e.g., at one or more suitable time intervals) provide motion data to motion classifier 224.

The motion classifier 224 may classify the received motion data into motion state information. The motion state information may indicate which of a number of motion states best describes the motion (or lack of motion) of the STA 200. For some implementations, the motion states indicated by the motion state information may include a number of course motion states such as, for example, a stationary motion state, a moving motion state, and a fiddle motion state. In some aspects, the motion classifier 224 may further classify the moving motion state as either a pedestrian motion state or a vehicle motion state, and may further classify the pedestrian motion state as either a walking motion state or as a running motion state. The motion classifier 224 may also use the motion data received from sensors 222 to detect changes in the motion state of the STA 200. For example, the motion state information generated by the motion classifier 224 may indicate whether the motion state of STA 200 has changed from one of the stationary motion state, the moving motion state, and the fiddle motion state to another of the stationary motion state, the moving motion state, and the fiddle motion state. The motion classifier 224 may also send control and/or configuration information to the sensors 222. In some aspects, the motion classifier 224 may be a coarse motion classifier (CMC) engine. In other aspects, the motion classifier 224 may be any other suitable engine, circuit, or processor.

The motion state information generated by the motion classifier 224 may also include a time period during which STA 200 has been in the current motion state, a time period since a previous transition between motion states, and/or a history of the motion states of STA 200. The motion classifier 224 may send the motion state information to WCNSS 210 via link 310. In addition, the motion classifier 224 may receive control and/or configuration information from the WCNSS 210 via link 310.

Continually generating motion state information and/or continually transmitting the motion state information to the WCNSS 210 may result in significant power consumption. For example, in some implementations, the power consumption associated with generating and transmitting motion state information from the motion sensor subsystem 220 to the WCNSS 210 via link 310 may be similar to the power consumption associated with performing hundreds (or even thousands) of roaming scans. Thus, in accordance with example embodiments, the motion sensor subsystem 220 may generate and/or transmit motion state information to the WCNSS 210 periodically to reduce power consumption. For example, in some aspects, the motion sensor subsystem 220 may transmit motion state information to the WCNSS 210 only when there is a change in the motion state of STA 200. Because changes in the motion state of STA 200 may be infrequent (e.g., less than 100 times per day for a typical user), transmitting motion state information to the WCNSS 210 via link 310 only when there is a motion state change of STA 200 may significantly reduce power consumption, for example, as compared to conventional motion-aided connectivity techniques in which motion state information is continuously provided to a wireless connectivity circuit or subsystem.

The link 310 between motion sensor subsystem 220 and the WCNSS 210 may be a direct link, which may allow motion sensor subsystem 220 to transmit motion state information to WCNSS 210 without waking up an application processor (not shown for simplicity) associated with the WCNSS 210. For at least some implementations, the link 310 may be a Mobile Station Modem (MSM) Interface available from QUALCOMM, Incorporated of San Diego, Calif.

As depicted in the example of FIG. 3, the WCNSS 210 may include transceivers 212, the scanning engine 214, and the MAWC circuit 216 described above with respect to FIG. 2. The WCNSS 210 may also include a Wi-Fi controller 213 that controls the transmission and reception of Wi-Fi signals to and from other devices. For example, the Wi-Fi controller 213 may facilitate the communication of signals between transceivers 212 and scanning engine 214, and may facilitate the communication of signals between transceivers 212 and MAWC circuit 216.

As mentioned above, the MAWC circuit 216 may receive motion state information from the motion sensor subsystem 220. The MAWC circuit 216 may receive RSSI values of one or more nearby APs, and may receive a connection status indicator from Wi-Fi controller 213. The connection status indicator may indicate whether the STA 200 is currently associated with an AP. For some implementations, the MAWC circuit 216 may generate a scan trigger based, at least in part, on the received motion state information, the received RSSI values, and/or the received connection status indicator. The scan trigger, when asserted by MAWC circuit 216, may cause the scanning engine 214 to initiate and perform one or more scanning operations. De-assertion of the scan trigger by MAWC circuit 216 may suppress scanning operations. The MAWC circuit 216 may also generate one or more threshold updates based, at least in part, on the received motion state information, the received RSSI values, and/or the received connection status indicators. The one or more threshold updates provided by MAWC circuit 216 may cause the scanning engine 214 to adjust the frequency and/or the conditions under which scanning operations are triggered, as described in more detail below. In other implementations, the MAWC circuit 216 may be omitted from the WCNSS 210.

The scanning engine 214 may send scan requests to Wi-Fi controller 213, which in response thereto may cause transceivers 212 to perform one or more scanning operations. The scanning engine 214 may receive results of the scanning operations from the Wi-Fi controller 213. The scanning engine 214 may use the received scan trigger, the threshold updates, and/or the scan results to determine when (and if) to perform scanning operations using the transceivers 212. For some implementations, scanning engine 214 may include a legacy fast roaming (LFR) engine (not shown for simplicity). The LFR engine, which is well-known in the art, may monitor the RSSI values of an associated AP and initiate a roaming scan operation if the monitored RSSI values fall below a threshold. In this manner, the scanning engine 214 may perform roaming scan operations in a conventional manner if motion state information is not available.

For other implementations, the scan results may be provided to MAWC circuit 216, which in turn may selectively assert the scan trigger based, at least in part, on the received scan results.

Figure 4:
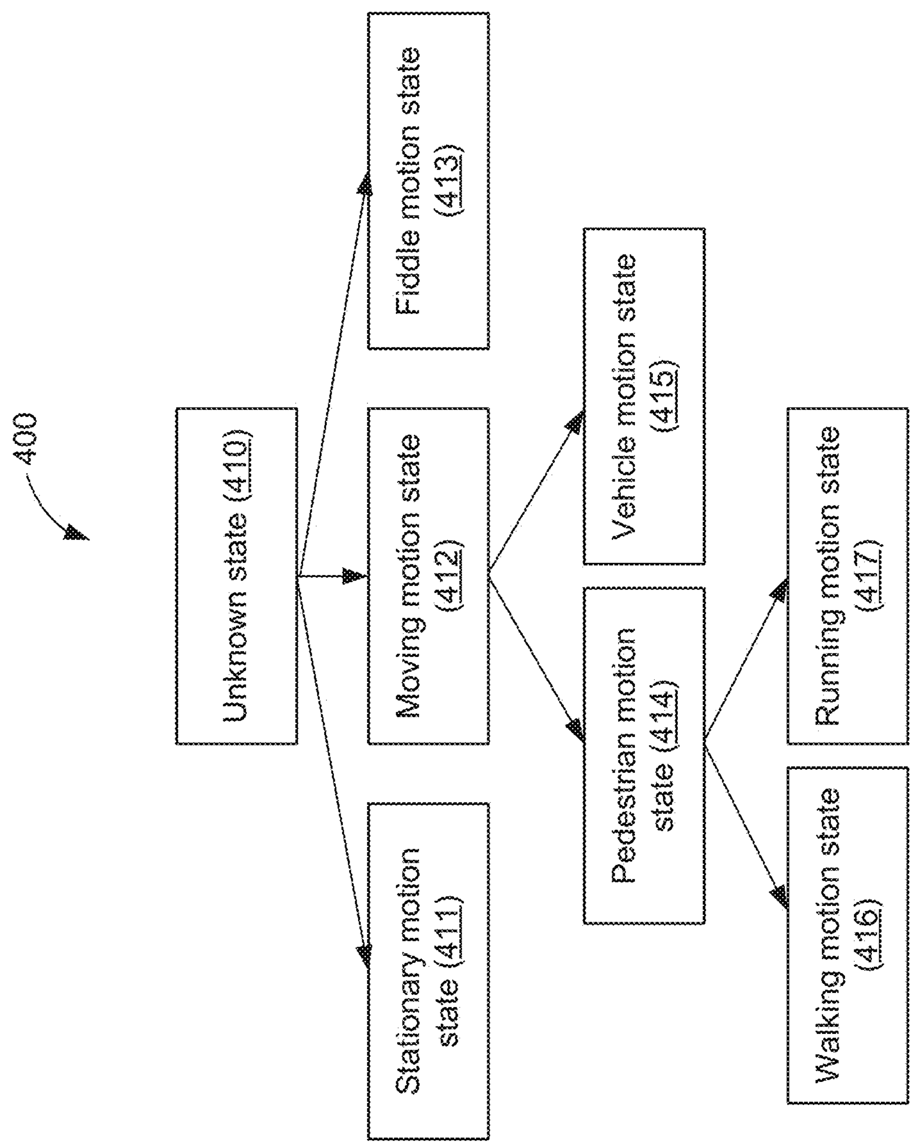
FIG. 4 depicts example motion states of a wireless device in accordance with example embodiments.

FIG. 4 shows a motion state graph 400 depicting example motion states of a wireless device in accordance with example embodiments. For example, referring also to FIGS. 2 and 3, the motion classifier 224 may classify the motion state of STA 200 according to motion state graph 400. As shown in FIG. 4, motion classifier 224 may initialize a current motion state of STA 200 to an unknown state 410. Thereafter, motion classifier 224 may analyze motion data received from sensors 222 to determine a current motion state of the STA 200. For example, if the motion data indicates that STA 200 is not in motion, then motion classifier 224 may determine that the STA 200 is in the stationary motion state 411. Conversely, if the motion data indicates that STA 200 is in motion, then motion classifier 224 may determine that the STA 200 is in the moving motion state 412. Further, if the motion data indicates that an orientation of STA 200 is changing and/or that the STA 200 is in motion only with respect to a user, then motion classifier 224 may determine that the STA 200 is in the fiddle motion state 413. More specifically, the fiddle motion state 413 may indicate that the user is holding the STA 200 in a manner that results in slight motion of the STA 200. For one example, the fiddle motion state 413 may correspond to a user moving the STA 200 from a pocket towards the user's face to answer a phone call. For another example, the fiddle motion state 413 may correspond to a user moving the STA 200 in a manner consistent with taking a picture using the STA 200.

The motion classifier 224 may further characterize the moving motion state 412 as one of a pedestrian motion state 414 or a vehicle motion state 415. The pedestrian motion state 414 may indicate that the STA 200 is moving at a speed consistent with a person walking or running. In some aspects, the pedestrian motion state 414 may be further classified into a walking motion state 416 or a running motion state 417. The vehicle motion state 415 may indicate that the STA 200 is moving at a speed consistent with a person traveling in a car, bus, train, or other vehicle.

As mentioned above, the scanning engine 214 may initiate scan operations based, at least in part, on the scan trigger, the scan results, and/or one or more threshold values. These threshold values may be updated (e.g., increased or decreased) by the MAWC circuit 216 based on the received motion state information, the received RSSI values, and/or the received connection status indicators. For example, the scanning engine 214 may trigger scanning operations when the received RSSI value of an associated AP falls below a first threshold value and/or may suppress scanning operations when the received RSSI value is greater than a second threshold value. The second threshold value may be greater than the first threshold value to prevent AP ping-ponging (e.g., by introducing a form of hysteresis into the triggering of scanning operations). For example, in some aspects, the first threshold value may be set to an initial value of approximately −76 dBm, and the second threshold value may be set to an initial value of approximately −68 dBm. In this manner, the scanning engine 214 may trigger a roaming scan when the RSSI value of the currently associated AP drops below approximately −76 dBm, and may suppress roaming scans when the RSSI value of the currently associated AP remains above approximately −68 dBm.

After the roaming scan is complete, the scan results may be provided to the scanning engine 214 via the Wi-Fi controller 213. The first and/or second threshold values may be adjusted (e.g., increased or decreased) based on the scan results, the motion state information of the STA 200, and/or the connection status of the STA 200. For one example, if the scan results indicate that the STA 200 found and associated with another AP (e.g., the STA 200 "roamed" to the other AP), then the first and second threshold values may remain the same. Conversely, if the scan results indicate that the STA 200 did not roam to another AP and the motion state information indicates that the STA 200 did not move (e.g., the STA 200 remained in the stationary motion state), then the first threshold value and/or the second threshold value may each be increased from the initial value to a higher value, for example, to decrease the likelihood of performing additional roaming scans operations while the STA 200 remains stationary (and thus reduce power consumption). In some aspects, the first and second threshold values may be increased by approximately 5 dBm when the STA 200 remains stationary and connected to the AP.

In some aspects, if the STA 200 is connected to a SoftAP (e.g., as a mobile device such as another STA), then it may not be advantageous to suppress or reduce the likelihood of performing roaming scans, for example, because dedicated APs may provide better connectivity than SoftAPs.

For another example, if the scan results indicate that more than a selected number of APs were identified as potential candidate APs (e.g., in a dense Wi-Fi coverage area), then the first threshold value may be increased from its initial value to a higher value (e.g., by approximately 5 dBm) to decrease the likelihood (and thus decrease the frequency) of performing additional scanning operations.

The STA 200 may perform scanning operations even when the RSSI value of the associated AP does not fall below the first threshold value. For one example, if the STA 200 does not receive any beacon frames for a given time period, then the scanning engine 214 may trigger scanning operations regardless of the RSSI values of the associated AP. In some aspects, the time period may correspond to a selected number of consecutive target beacon transmission times (TBTT) intervals.

When STA 200 is not associated with an AP and is stationary, it may be unlikely that the STA 200 will find new APs with which to associate, particularly if the STA 200 previously performed a scanning operation at the same location. Thus, if STA 200 is not connected to an AP and is in the stationary motion state 411, then the MAWC circuit 216 may decrease the likelihood of performing scanning operations to reduce power consumption, for example, by increasing the first threshold value from its initial value to a higher value. In some aspects, the MAWC circuit 216 may increase the first threshold value by approximately 5 dBm.

When STA 200 is not associated with an AP and is travelling in a vehicle such as a car or a bus, the STA 200 may detect new APs. However, because of the speed with which the STA 200 is moving, the STA 200 is likely to pass through the coverage area of each newly detected AP relatively quickly. Thus, because these newly detected APs are not likely to provide persistent connectivity for the STA 200, the MAWC circuit 216 may reduce the frequency of disconnected scans (e.g., PNO scans) when STA 200 is disconnected and in the vehicle motion state 415.

When STA 200 is in motion and then stops at a location, the STA 200 may be likely to remain in the location for a period of time. For example, a user may have returned home, arrived at work, or arrived at the location for a meeting. In such situations, it may be advantageous to ensure that the STA 200 is connected to the best available AP. Thus, when MAWC circuit 216 receives an indication that the STA's motion state has changed from the moving motion state 412 to the stationary motion state 411, the MAWC circuit 216 may trigger one or more roaming scans. After the STA 200 becomes associated with an AP, the MAWC circuit 216 may wait until the traffic load of the associated AP is above a threshold before triggering additional roaming scans and/or may trigger additional roaming scans only if the RSSI value of the associated AP falls below the first threshold value.

FIG. 5 shows a table 500 describing example use cases for MAWC circuit 216, in accordance with example embodiments. As described above, the MAWC circuit 216 may suppress some connected scans (e.g., roaming scans) when the STA 200 is stationary and connected to an AP, may reduce the frequency of unconnected scans (e.g., PNO scans) when the STA 200 is stationary and not connected with an AP, and may reduce the frequency of unconnected scans (e.g., PNO scans) when the STA 200 is in a vehicle and not connected with an AP. The MAWC circuit 216 may also trigger one or more roaming scans when the motion state of the STA 200 changes from the moving motion state 412 to the stationary motion state 411.

Although the motion classifier 224 may be a low power circuit, it may be advantageous to conserve power consumption of motion classifier motion classifier 224 in some situations. For example, it may be desirable to power up motion classifier 224 only when the MAWC circuit 216 needs updated motion state information from motion classifier 224. Thus, in some aspects, motion classifier 224 may be powered on when the STA 200 is connected to an AP, when network traffic is above a threshold, and/or when more than a selected number of APs are detected. In other aspects, motion classifier 224 may be powered on when STA 200 is not connected to an AP.

Figure 6:
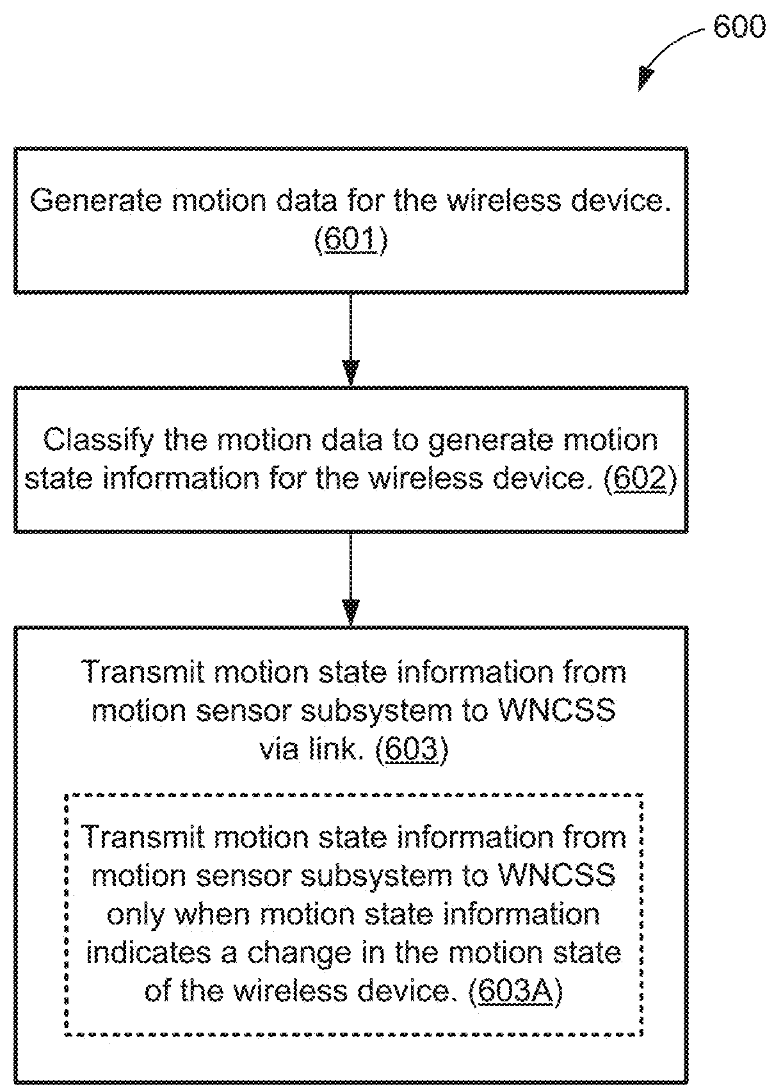
FIG. 6 shows an illustrative flow chart depicting an example operation for classifying motion data into motion state information.

FIG. 6 shows an illustrative flow chart depicting an example operation 600 for classifying motion data into motion state information in accordance with example embodiments. The example operation 600 is described below with respect to a wireless device. In some aspects, the wireless device may be one of stations STA1-STA4 of FIG. 1 or STA 200 of FIG. 2. As described above, a wireless device may receive or generate motion data indicating whether the wireless device is moving or is stationary (601). In some aspects, the motion data may be received or generated by the sensors 222 of FIG. 3. In other aspects, the motion data may be received or generated by executing the sensor subsystem management software module 243 of FIG. 2.

Then, the motion data is classified to generate motion state information for the wireless device (602). As described above with respect to FIG. 4, the motion data may be classified as one of a stationary motion state 411, a moving motion state 412, or a fiddle motion state 413. In addition, the motion state information may indicate whether the wireless device transitioned between motion states, and if so, how long the wireless device has been in the current motion state and/or how much time has elapsed since the last motion state change. In some aspects, the motion data may be classified by the motion classifier 224 of FIG. 3 to generate the motion state information. In other aspects, the motion data may be classified to generate the motion state information by executing the sensor subsystem management software module 243 of FIG. 2.

The motion state information may be transmitted from the motion sensor subsystem 220 to the WCNSS 210 via link 310 (603). In some implementations, the motion state information may be transmitted to the WCNSS 210 only when the motion state information indicates a change in motion states of the wireless device (603A). As described above, transmitting the motion state information from the motion sensor subsystem 220 to the WCNSS 210 only when there is a change in the motion state of the wireless device may reduce power consumption. In other implementations, the motion state information may be transmitted to the WCNSS 210 continuously or according to one or more time intervals.

Figure 7A:
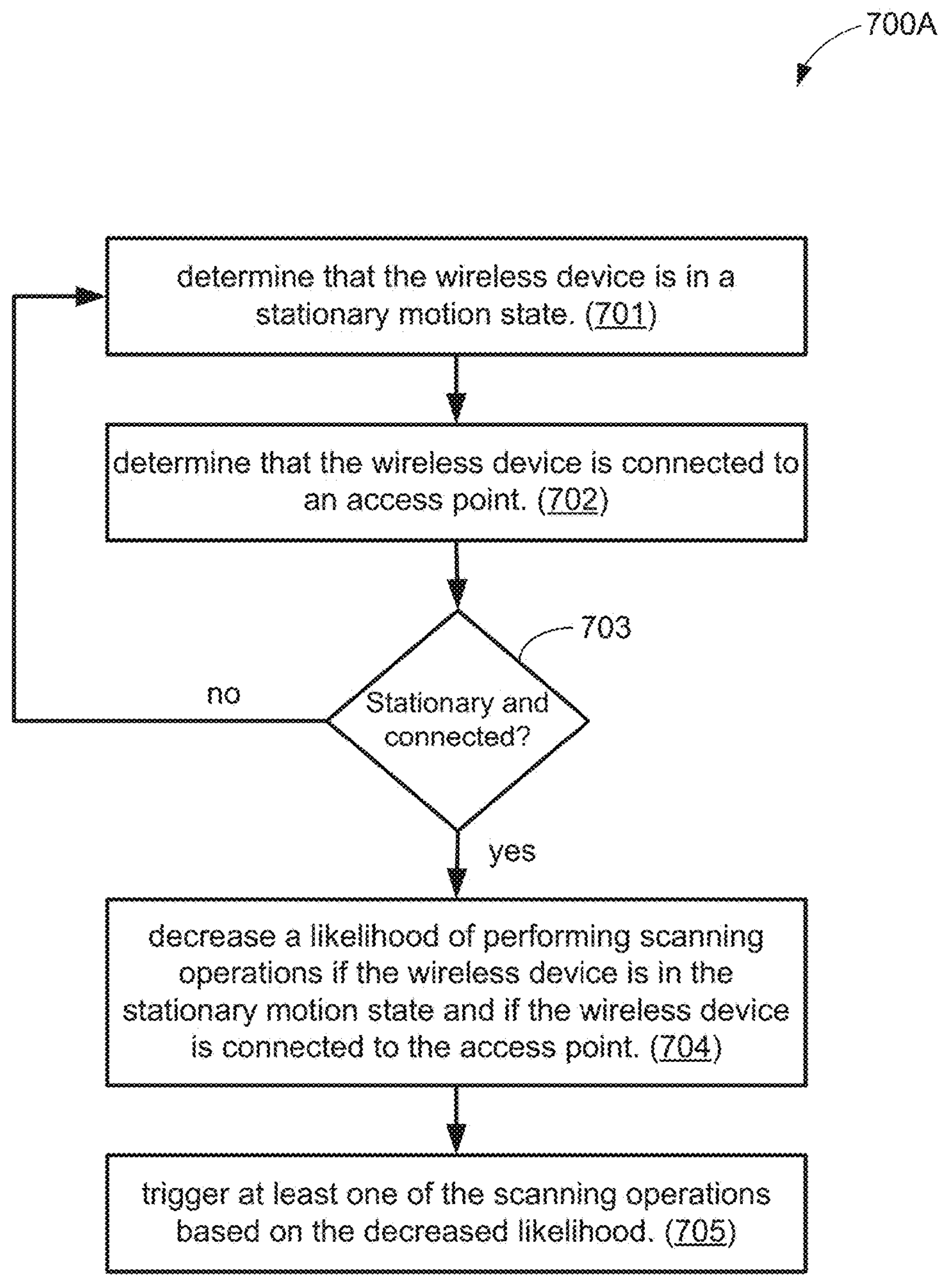
FIG. 7A shows an illustrative flow chart depicting an example operation for initiating scanning operations.

FIG. 7A shows an illustrative flow chart depicting an example operation 700A for initiating scanning operations in accordance with example embodiments. The example operation 700A is described below with respect to a wireless device. In some aspects, the wireless device may be one of stations STA1-STA4 of FIG. 1 or STA 200 of FIG. 2. As described above, the wireless device may determine its current motion state, may determine a transition from a previous motion state to the current motion state, and may determine a period of time that the wireless device has been in the current motion state and/or a period of time since a previous change in motion states.

For the example operation 700A, the wireless device may determine that it is in the stationary motion state 411 (701). In some aspects, the stationary motion state 411 may be determined by the MAWC circuit 216 based on motion state information received from sensor subsystem 220. In other aspects, the wireless device may determine its motion state by executing the MAWC SW module 244 of FIG. 2.

Next, the wireless device may determine that it is connected to an access point (702). In some aspects, the MAWC circuit 216 may determine that the wireless device is associated with the access point based on the connection status indicators received from the Wi-Fi controller 213. In other aspects, the wireless device may determine that it is associated with the access point by executing the MAWC SW module 244 of FIG. 2.

If the wireless device determines that it is in the stationary motion state and connected to the access point, as tested at 703, then the wireless device may decrease a likelihood of performing scanning operations (704). As mentioned above, when a wireless device is stationary and connected to an access point, the wireless device is unlikely to discover new access points, and therefore the likelihood of roaming scans may be decreased to reduce power consumption without degrading the ability of the wireless device to find the best available AP. In some aspects, the MAWC circuit 216 may decrease the likelihood of performing scanning operations by providing threshold value updates to the scanning engine 214. In other aspects, the likelihood of performing scanning operations may be decreased by executing the MAWC SW module 244 of FIG. 2. Conversely, if the wireless device determines that it is not in the stationary motion state and/or is not connected to the access point, as tested at 703, then operations may continue at 701.

The wireless device may trigger at least one of the scanning operations based on the decreased likelihood (705). In some aspects, the scanning engine 214 may trigger scanning operations based on the updated threshold values provided by the MAWC circuit 216.

Figure 7B:
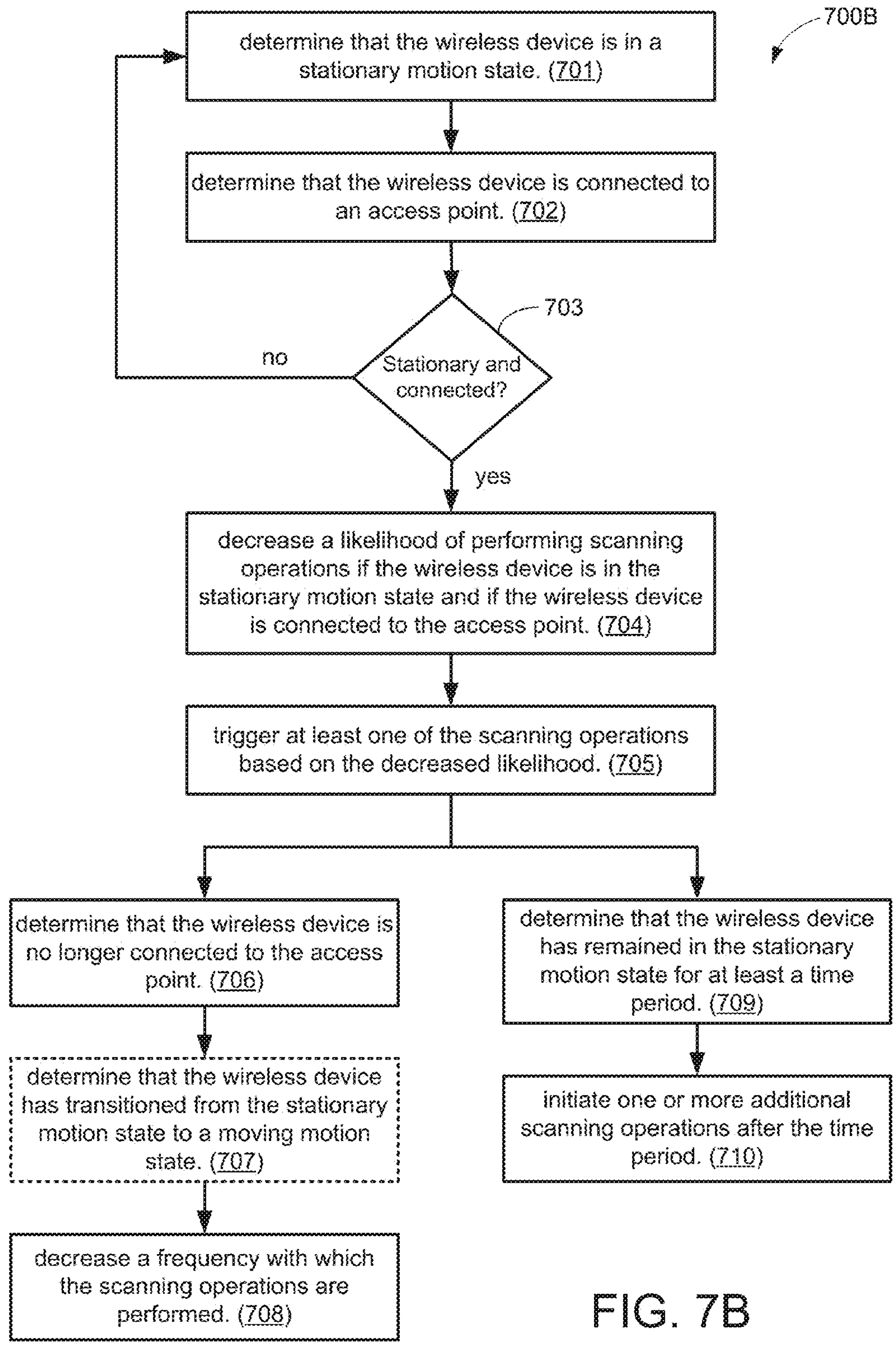
FIG. 7B shows an illustrative flow chart depicting another example operation for initiating scanning operations.

FIG. 7B shows an illustrative flow chart depicting another example operation 700B for initiating scanning operations in accordance with example embodiments. The example operation 700B is described below with respect to a wireless device. In some aspects, the wireless device may be one of stations STA1-STA4 of FIG. 1 or STA 200 of FIG. 2. As described above, the wireless device may determine its current motion state, may determine a transition from a previous motion state to the current motion state, and may determine a period of time that the wireless device has been in the current motion state and/or a period of time since a previous change in motion states.

For the example operation 700B, the wireless device may determine that it is in the stationary motion state 411 (701). In some aspects, the stationary motion state 411 may be determined by the MAWC circuit 216 based on motion state information received from sensor subsystem 220. In other aspects, the wireless device may determine its motion state by executing the MAWC SW module 244 of FIG. 2.

Next, the wireless device may determine that it is connected to an access point (702). In some aspects, the MAWC circuit 216 may determine that the wireless device is associated with the access point based on the connection status indicators received from the Wi-Fi controller 213. In other aspects, the wireless device may determine that it is associated with the access point by executing the MAWC SW module 244 of FIG. 2.

If the wireless device determines that it is in the stationary motion state and connected to the access point, as tested at 703, then the wireless device may decrease a likelihood of performing scanning operations (704). As mentioned above, when a wireless device is stationary and connected to an access point, the wireless device is unlikely to discover new access points, and therefore the likelihood of roaming scans may be decreased to reduce power consumption without degrading the ability of the wireless device to find the best available AP. In some aspects, the MAWC circuit 216 may decrease the likelihood of performing scanning operations by providing threshold value updates to the scanning engine 214. In other aspects, the likelihood of performing scanning operations may be decreased by executing the MAWC SW module 244 of FIG. 2. Conversely, if the wireless device determines that it is not in the stationary motion state and/or is not connected to the access point, as tested at 703, then operations may continue at 701.

The wireless device may trigger at least one of the scanning operations based on the decreased likelihood (705). In some aspects, the scanning engine 214 may trigger scanning operations based on the updated threshold values provided by the MAWC circuit MAWC circuit 216.

Thereafter, the wireless device may determine that it is no longer connected to the access point (706). In some implementations, the wireless device may optionally determine that it has transitioned from the stationary motion state 411 to the moving motion state 412 (707). The wireless device may decrease a frequency with which scanning operations are performed based on the wireless device not being connected to an access point and/or based on the wireless device transitioning from the stationary motion state 411 to the moving motion state 412 (708).

In addition or as an alternative, the wireless device may determine that it has remained in the stationary motion state 411 for at least a time period (709), and may then initiate one or more additional scanning operations after the time period (710). In some aspects, the MAWC circuit 216 may determine that the wireless device has remained in the stationary motion state 411 for at least the time period based on the motion state information received from the motion classifier 224, and in response thereto, assert the scan trigger. Assertion of the scan trigger may cause the scanning engine 214 to initiate the one or more additional scanning operations.

Figure 8:
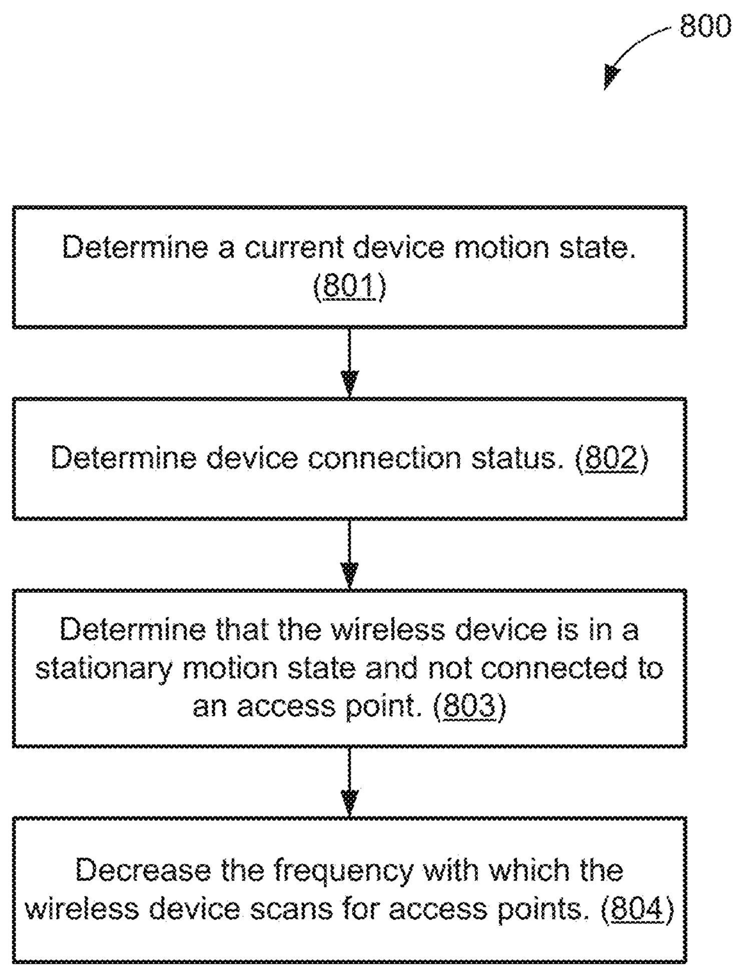
FIG. 8 shows an illustrative flow chart depicting an example operation for performing scanning operations.

FIG. 8 shows an illustrative flow chart depicting a roaming operation 800 in accordance with example embodiments. The example operation 800 is described below with respect to a wireless device. In some aspects, the wireless device may be one of stations STA1-STA4 of FIG. 1 or STA 200 of FIG. 2. As shown in FIG. 8, a STA may determine a current device motion state (801). The current motion state may be determined using sensor subsystem 260 and/or by executing sensor subsystem management software module 243 of FIG. 2. The current device motion state may be determined using motion classifier 224 of FIG. 3, which may determine a motion state based on samples received from one or more sensors, such as sensors 222 of FIG. 3. In example embodiments, motion classifier 224 may be a CMC motion engine. The motion classifier 224 may only communicate a motion state upon determining that the motion state has changed. The motion classifier 224 may communicate the motion state over a direct link to MAWC module 216 of FIG. 3. In example embodiments, the motion state may be one of the following: stationary; in motion; fiddle; pedestrian; vehicle; walking; or running.

After determining a current device motion state, the STA may determine a device connection status (802). The device connection status may be determined by consulting AP profile data store 241, and/or by executing scanning management software module 245 of STA 200 of FIG. 2. The connection status may indicate that the STA is connected to an AP or that the STA is disconnected. In accordance with example embodiments, the connection status may indicate that the STA is connected to a Soft AP.

After determining a current device motion state and a device connection status, the STA may determine that the current device motion state is a stationary motion state, and that the device connection status indicates that the STA is not connected to an access point (803). This determination may be made by executing motion-aided Wi-Fi connectivity software module 244 of STA 200 of FIG. 2, and/or by using MAWC module 216 of FIG. 3.

After determining that the current device motion state is a stationary motion state, and that the STA's connection status indicates the device is not connected to an access point, the frequency with which the device scans for access points may be reduced (804). This scanning frequency may be reduced by executing motion-aided Wi-Fi connectivity software module 244 of STA 200 of FIG. 2, or by using MAWC module 216 of FIG. 3. The STA may scan for access points using a roaming engine, and reducing the frequency with which the STA scans for access points may comprise reducing the frequency with which the roaming engine scans for access points. The roaming engine may be an LFR roaming engine. In example embodiments, scanning for access points may comprise PNO scans or GSCAN, and reducing the frequency with which the roaming engine scans for access points may include reducing the frequency of PNO scans and GSCAN.

Figure 9:
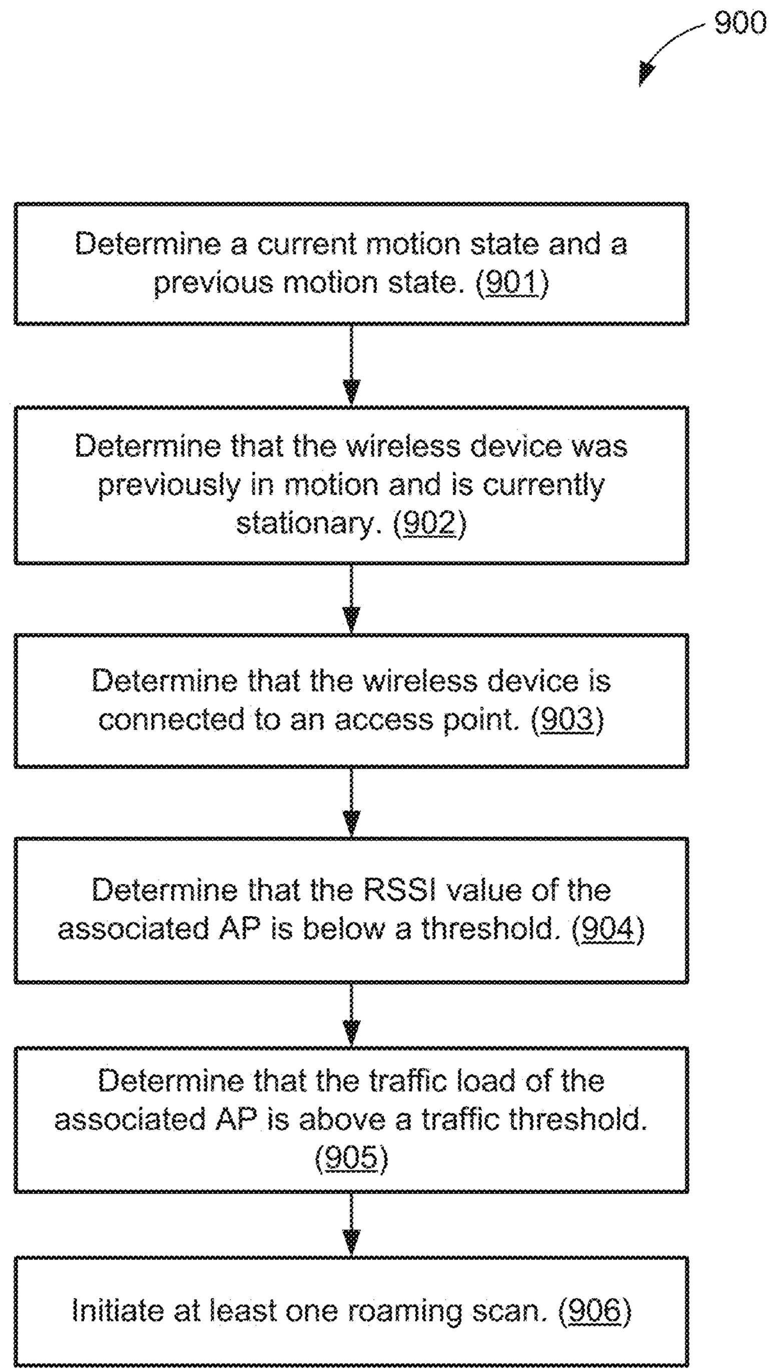
FIG. 9 shows an illustrative flow chart depicting another example operation for performing scanning operations.

FIG. 9 shows an illustrative flow chart depicting an example scanning operation 900 in accordance with example embodiments. The example operation 900 is described below with respect to a wireless device. The wireless device may be one of stations STA1-STA4 of FIG. 1 or STA 200 of FIG. 2. As shown in FIG. 9, the wireless device may determine a current motion state and a previous motion state (901). The current motion state and/or the previous motion state may be determined by motion sensor subsystem 220 and/or by executing sensor subsystem management software module 243 of FIG. 2.

For the example of FIG. 9, the current motion state and the previous motion state may indicate that the wireless device was previously in motion and is currently stationary (902). This determination may be made by MAWC circuit 216 and/or by executing the MAWC software module 244 of FIG. 2.

The wireless device may determine that it is connected to an access point (903). The connection status may be determined based on the connection status indicators provided by Wi-Fi controller 213 and/or by executing the scanning management software module 245 of FIG. 2.

The wireless device may determine that the RSSI value of the associated access point is below a threshold (904). This determination may be made by MAWC circuit 216 and/or by executing the scanning management software module 245 of FIG. 2. In some aspects, the wireless device may compare the RSSI value of the associated access point with the first threshold value.

The wireless device may determine that a traffic load of the associated access point is above a traffic threshold (905). This determination may be made by the MAWC circuit 216 and/or by executing the scanning management software module 245 of FIG. 2. The traffic load of the associated access point being greater than the traffic threshold may indicate the likely presence of other APs near the location of the wireless device.

The wireless device may then initiate one or more roaming scans (906). More specifically, the wireless device may initiate the one or more roaming scans based on the motion state change (determined at 902), the connected status of the wireless device (determined at 903), the RSSI value being below the first threshold (determined at 904), and/or the traffic load of the associated access point being greater than the traffic threshold (determined at 905).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method of initiating scanning operations for local wireless networks, the method performed by a wireless device and comprising:

determining if the wireless device is in a stationary motion state and is connected to an access point;

decreasing a likelihood of performing the scanning operations if the wireless device is in the stationary motion state and is connected to the access point;

determining if the wireless device is no longer connected to the access point and has transitioned from the stationary motion state to a moving motion state;

decreasing a frequency with which the scanning operations are performed if the wireless device is no longer connected to the access point and has transitioned to the moving motion state; and triggering at least one of the scanning operations based on the decreased likelihood.

2. The method of claim 1, wherein triggering the at least one of the scanning operations is further based on the decreased frequency.

3. The method of claim 1, wherein the at least one scanning operation is triggered based on a signal strength indicator (RSSI) value of the connected access point being less than a selected signal strength value.

4. The method of claim 3, wherein decreasing the likelihood comprises:

decreasing the selected signal strength value from an initial value to a lower value.

5. The method of claim 4, wherein the lower value is approximately 5 dB less than the initial value.

6. The method of claim 1, further comprising:

determining if the wireless device has remained in the stationary motion state for at least a time period; and initiating one or more additional scanning operations after the time period.

7. The method of claim 1, wherein the scanning operations are triggered by a wireless connectivity subsystem of the wireless device, the method further comprising:

classifying motion data of the wireless device into motion state information using a motion classifier coupled to the wireless connectivity subsystem; and transmitting the motion state information from the motion classifier to the wireless connectivity subsystem only when the motion state information indicates a change in motion states of the wireless device.

8. A wireless device, comprising:

one or more transceivers;

one or more processors; and a memory storing one or more programs comprising instructions that, when executed by the one or more processors, cause the wireless device to:

determine if the wireless device is in a stationary motion state and is connected to an access point;

decrease a likelihood of performing scanning operations if the wireless device is in the stationary motion state and is connected to the access point;

determine if the wireless device is no longer connected to the access point and has transitioned from the stationary motion state to a moving motion state;

decrease a frequency with which the scanning operations are performed if the wireless device is no longer connected to the access point and has transitioned to the moving motion state; and trigger at least one of the scanning operations based on the decreased likelihood.

9. The wireless device of claim 8, wherein triggering the at least one of the scanning operations is further based on the decreased frequency.

10. The wireless device of claim 8, wherein the at least one scanning operation is triggered based on a signal strength indicator (RSSI) value of the connected access point being less than a selected signal strength value.

11. The wireless device of claim 10, wherein execution of the instructions for decreasing the likelihood causes the wireless device to further:

decrease the selected signal strength value from an initial value to a lower value.

12. The wireless device of claim 11, wherein the lower value is approximately 5 dB less than the initial value.

13. The wireless device of claim 8, wherein execution of the instructions causes the wireless device to further:

determine if the wireless device has remained in the stationary motion state for at least a time period; and initiate one or more additional scanning operations after the time period.

14. The wireless device of claim 8, wherein the scanning operations are triggered by a wireless connectivity subsystem of the wireless device, and wherein execution of the instructions causes the wireless device to further:

classify motion data of the wireless device into motion state information using a motion classifier coupled to the wireless connectivity subsystem; and transmit the motion state information from the motion classifier to the wireless connectivity subsystem only when the motion state information indicates a change in motion states of the wireless device.

15. A non-transitory computer-readable storage medium storing one or more programs containing instructions that, when executed by one or more processors of a wireless device, cause the wireless device to initiate scanning operations for local wireless networks by performing operations comprising:

determining if the wireless device is in a stationary motion state and is connected to an access point;

decreasing a likelihood of performing the scanning operations if the wireless device is in the stationary motion state and is connected to the access point;

determining if the wireless device is no longer connected to the access point and has transitioned from the stationary motion state to a moving motion state;

decreasing a frequency with which the scanning operations are performed if the wireless device is no longer connected to the access point and has transitioned to the moving motion state; and triggering at least one of the scanning operations based on the decreased likelihood.

16. The non-transitory computer-readable storage medium of claim 15, wherein triggering the at least one of the scanning operations is further based on the decreased frequency.

17. The non-transitory computer-readable storage medium of claim 15, wherein the at least one scanning operation is triggered based on a signal strength indicator (RSSI) value of the connected access point being less than a selected signal strength value.

18. The non-transitory computer-readable storage medium of claim 17, wherein execution of the instructions for decreasing the likelihood causes the wireless device to perform operations further comprising:

decreasing the selected signal strength value from an initial value to a lower value.

19. The non-transitory computer-readable storage medium of claim 15, wherein execution of the instructions causes the wireless device to further:

determine if the wireless device has remained in the stationary motion state for at least a time period; and initiate one or more additional scanning operations after the time period.

20. The non-transitory computer-readable storage medium of claim 15, wherein the scanning operations are triggered by a wireless connectivity subsystem of the wireless device, and wherein execution of the instructions causes the wireless device to perform operations further comprising:

classifying motion data of the wireless device into motion state information using a motion classifier coupled to the wireless connectivity subsystem; and transmitting the motion state information from the motion classifier to the wireless connectivity subsystem only when the motion state information indicates a change in motion states of the wireless device.

21. A wireless device configured to initiate scanning operations for local wireless networks, the wireless device comprising:

means for determining if the wireless device is in a stationary motion state and is connected to an access point;

means for decreasing a likelihood of performing the scanning operations if the wireless device is in the stationary motion state and is connected to the access point;

means for determining if the wireless device is no longer connected to the access point and has transitioned to a moving motion state;

means for decreasing a frequency with which the scanning operations are performed if the wireless device is no longer connected to the access point and has transitioned to the moving state; and means for triggering at least one of the scanning operations based on the decreased likelihood.

22. The wireless device of claim 21, wherein the means for triggering the at least one of the scanning operations is further based on the decreased frequency.

23. The wireless device of claim 21, wherein the at least one scanning operation is triggered based on a signal strength indicator (RSSI) value of the connected access point being less than a selected signal strength value.

24. The wireless device of claim 21, wherein the means for decreasing the likelihood is to:

decrease a selected signal strength value from an initial value to a lower value.

25. The wireless device of claim 21, further comprising:

means for determining if the wireless device has remained in the stationary motion state for at least a time period; and means for initiating one or more additional scanning operations after the time period.

26. The wireless device of claim 21, wherein the scanning operations are triggered by a wireless connectivity subsystem of the wireless device, the wireless device further comprising:

means for classifying motion data of the wireless device into motion state information using a motion classifier of the wireless device; and means for transmitting the motion state information from the motion classifier to the wireless connectivity subsystem only when the motion state information indicates a change in motion states of the wireless device.

* * * * *